(12) United States Patent
Lee et al.

(10) Patent No.: US 11,214,183 B2
(45) Date of Patent: Jan. 4, 2022

(54) VENTILATION AND MASSAGE DEVICE FOR VEHICLE SEAT

(71) Applicants: Hyundai Motor Company, Seoul (KR); Kia Motors Corporation, Seoul (KR)

(72) Inventors: Baek Hee Lee, Suwon-Si (KR); Gyu Ho Chung, Yongin-Si (KR); Jong Hun Lee, Hwaseong-Si (KR); Yo Seob Lee, Incheon (KR); Hyun Kyu Park, Hwaseong-Si (KR); Min Hyuk Kwak, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/871,868

(22) Filed: May 11, 2020

(65) Prior Publication Data

US 2021/0162904 A1 Jun. 3, 2021

(30) Foreign Application Priority Data

Dec. 2, 2019 (KR) .......................... 10-2019-0158006

(51) Int. Cl.
*B60N 2/90* (2018.01)
*B60N 2/56* (2006.01)

(52) U.S. Cl.
CPC ........... *B60N 2/976* (2018.02); *B60N 2/5621* (2013.01); *B60N 2/5678* (2013.01)

(58) Field of Classification Search
CPC ............ A61G 7/05784; A61G 7/05769; A61G 2203/34; A61G 5/10
See application file for complete search history.

(56) References Cited

U.S. PATENT DOCUMENTS

| 5,590,428 A | * | 1/1997 | Roter | ................... A47C 27/081 297/180.13 |
| 2012/0060294 A1 | * | 3/2012 | Dzioba | ................ A47C 27/081 5/655.3 |
| 2014/0110978 A1 | * | 4/2014 | Schneider | .......... A61G 7/05784 297/180.1 |

* cited by examiner

*Primary Examiner* — Sarah B McPartlin
(74) *Attorney, Agent, or Firm* — Morgan, Lewis & Bockius LLP

(57) ABSTRACT

A ventilation and massage device for a seat, may include a seat foam pad including a plurality of air discharge holes formed in the seat foam; an air distribution duct mounted in a space in a rear surface of the seat foam pad and fluidically-connected to the plurality of air discharge holes, the air distribution duct being configured to distribute air to the air discharge holes; massage units mounted on a bottom surface of the air distribution duct, the massage units being configured to move forwards and backwards to open or close the air discharge holes or penetrate the air discharge holes; and a controller electrically connected to the massage units and configured to control an amount of movement of the massage units based on information related to a body pressure of an occupant accommodated in the seat and information related to a temperature and humidity at a contact portion between the occupant and the seat.

11 Claims, 7 Drawing Sheets

VENTILATION AND MASSAGE DEVICE FOR VEHICLE SEAT

CROSS-REFERENCE TO RELATED APPLICATION

The present application claims priority to Korean Patent Application No. 10-2019-0158006 filed on Dec. 2, 2019, the entire contents of which is incorporated herein for all purposes by this reference.

BACKGROUND OF THE INVENTION

Field of the Invention

The present invention relates to a ventilation and massage device for a seat. More particularly, it relates to a ventilation and massage device for a seat, which is configured such that massage units are mounted in an air ventilation passage formed in a seat of a vehicle to selectively or simultaneously provide a ventilation function and a massage function to an occupant accommodated in the seat.

Description of Related Art

When an occupant is accommodated in a seat of a vehicle for a long time, ventilation between the seat and an occupant's body portion (particularly, the back or the hips) that closely contacts with the seat is impeded. Therefore, to eliminate discomfort such as sweating of the body portion that closely contacts with the seat, a vehicle is provided with a ventilated seat, which discharges cool air, having passed through a duct from an air-conditioning device of the vehicle, toward the occupant through an air passage formed in a seat pad or the like, increasing the riding comfort of the occupant.

Furthermore, when an occupant is accommodated in a seat of a vehicle for a long time, the occupant may suffer from muscular stiffness or muscular pain in the hips, back, shoulders, etc. To eliminate the present discomfort, a seat of a vehicle is provided with a massage device configured for massaging the occupant's body.

However, because an air ventilation passage is formed in a limited area within the space of a seat, and a massage device is also mounted at a specific position in the seat, the overall size of the seat is inevitably increased.

Furthermore, the conventional ventilated seat has a shortcoming in that it is not capable of intensively discharging cool air to a body portion desired by the user, and the conventional massage device has a shortcoming in that it is not capable of intensively massaging only a body portion desired by the user.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing ventilation and massage device configured for a seat, which is configured such that massage units, which are configured to be movable forwards and backwards thereof, are mounted in an air ventilation passage formed in a seat of a vehicle to selectively or simultaneously realize a ventilation function for discharging air toward a body portion desired by an occupant and a massage function for massaging a body portion desired by an occupant.

The objects of the present invention are not limited to the above-mentioned objects, and other objects not mentioned herein will be clearly understood by those skilled in the art from the following description, and will become apparent with reference to the exemplary embodiments of the present invention. Furthermore, the objects of the present invention may be accomplished by the components described in the appended claims and combinations thereof.

Various aspects of the present invention provide a ventilation and massage device configured for a seat, including a seat foam pad including a plurality of air discharge holes formed therein, an air distribution duct mounted in a space in the rear surface of the seat foam pad and configured to distribute air to the air discharge holes, massage units mounted on the bottom surface of the air distribution duct and configured to move forwards and backwards to open or close the air discharge holes or penetrate the air discharge holes, and a controller electrically connected to the massage units and configured to control an amount of movement of the massage units based on information related to a body pressure of an occupant accommodated in the seat and information related to a temperature and humidity at a contact portion between the occupant and the seat.

In an exemplary embodiment of the present invention, the ventilation and massage device may further include an air supply duct connected to the air distribution duct to supply air from an air blower to the air distribution duct.

In another exemplary embodiment of the present invention, each of the massage units may include an air tube having bellows, and in the state of being secured to the bottom portion of the air distribution duct, the air tube may move forwards toward a corresponding one of the air discharge holes while being expanded by air-charging pressure and may move backwards away from a corresponding one of the air discharge holes while being contracted by air-suctioning pressure in the air tube.

In yet another exemplary embodiment of the present invention, each of the massage units may further include a massage bar attached to the front end portion of the air tube, and the massage bar may block a corresponding one of the air discharge holes formed in the seat foam pad or may penetrate a corresponding one of the air discharge holes to massage the occupant's body.

In yet another exemplary embodiment of the present invention, the ventilation and massage device may further include an air pump connected to the rear end portion of the air tube via an air hose, and the air pump may be driven and controlled by the controller to charge air into or draw air from the air tube.

In still yet another exemplary embodiment of the present invention, the air tube may move a predetermined distance forwards and backwards to open or close a corresponding one of the air discharge holes in accordance with a first amount of driving of the air pump in a response to a ventilation mode control signal of the controller, or may move a predetermined distance forwards and backwards to penetrate a corresponding one of the air discharge holes in accordance with a second amount of driving of the air pump in a response to a massage mode control signal of the controller.

In a further exemplary embodiment of the present invention, the air distribution duct may include tube guides formed at an outlet thereof to guide the massage units toward the air discharge holes.

In another further exemplary embodiment of the present invention, the ventilation and massage device may further include a body-pressure-detecting mat mounted between the seat foam pad and a seat cover mounted thereon to provide body pressure information to the controller, and the body-pressure-detecting mat may be provided with a plurality of body pressure sensors attached thereto and may be made of a flexible material.

In yet another further exemplary embodiment of the present invention, the ventilation and massage device may further include temperature sensor and a humidity sensor, and the temperature sensor and the humidity sensor may be attached to positions adjacent to an outlet of each of the air discharge holes formed in the seat foam pad to provide temperature and humidity information to the controller.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
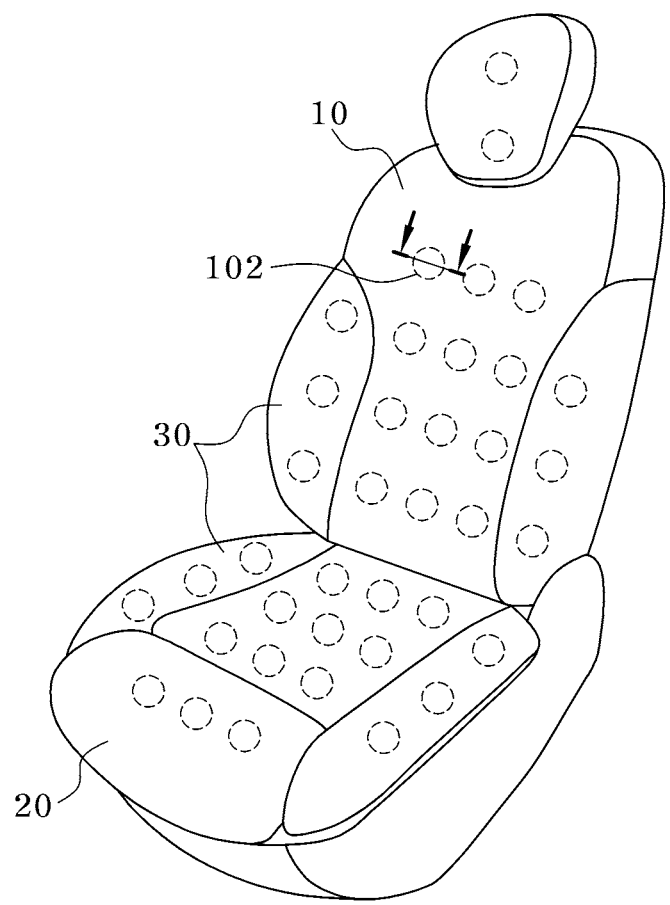
FIG. 1 is a view schematically illustrating the position at which a ventilation and massage device configured for a seat according to an exemplary embodiment of the present invention is mounted.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in portion by the particular intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

Figure 2:
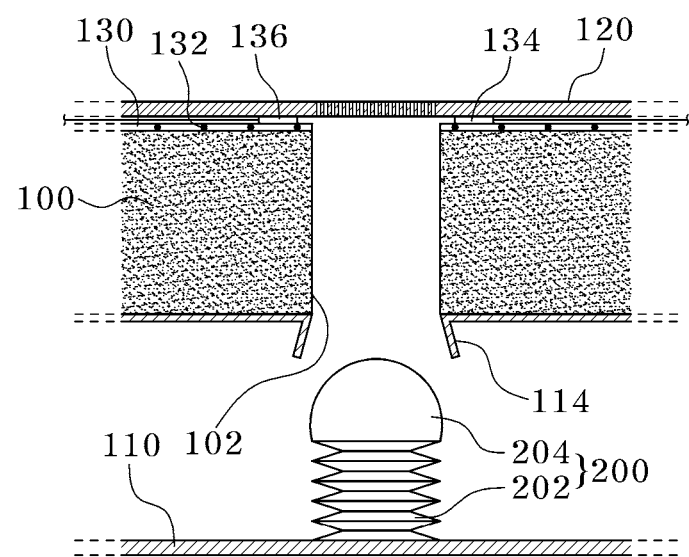
FIG. 2 is a cross-sectional view taken along line A-A in FIG. 1 to show the configuration of the ventilation and massage device configured for a seat according to an exemplary embodiment of the present invention.
Figure 3:
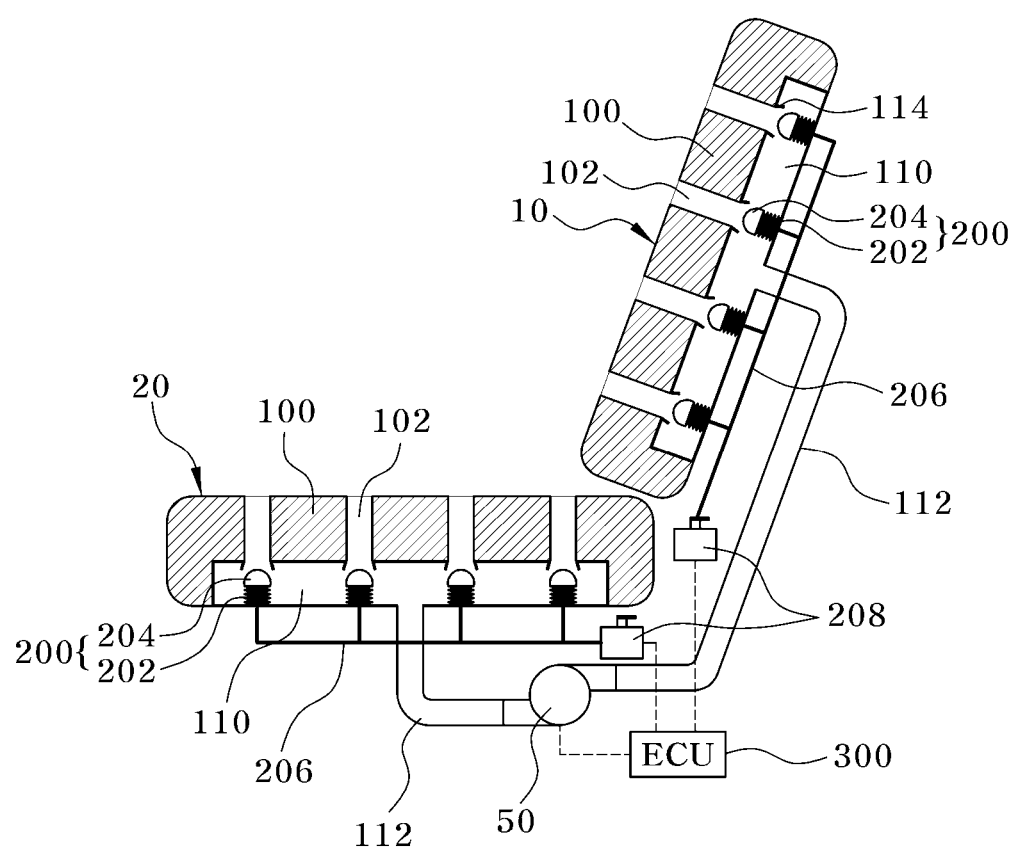
FIG. 3 is a side cross-sectional view exemplarily illustrating a seat including the ventilation and massage device according to an exemplary embodiment of the present invention.

FIG. 1 is a view schematically illustrating the position at which a ventilation and massage device configured for a seat according to an exemplary embodiment of the present invention is mounted, FIG. 2 is a cross-sectional view taken along line A-A in FIG. 1, and FIG. 3 is a side cross-sectional view exemplarily illustrating a seat including the ventilation and massage device according to an exemplary embodiment of the present invention.

As shown in FIG. 1, FIG. 2, and FIG. 3, a plurality of air discharge holes 102 is formed in a seat foam pad 100 of a seat. Each of the air discharge holes 102 is used as an air discharge passage for ventilation and a passage through which a respective one of massage units 200 moves forwards and backwards thereof.

For example, as shown in FIG. 1, twelve or more air discharge holes 102 may be formed at regular intervals in the surface of a seat cushion 10 which is in contact with front and rear portions of the hips and front and rear portions of the thighs. Furthermore, twelve or more air discharge holes 102 may be formed at regular intervals in the surface of a seat back 20 which is in contact with an upper end portion and a middle portion of the back and a middle portion and a lower end portion of the waist. Furthermore, twelve or more air discharge holes 102 may be formed at regular intervals in side bolsters 30 of the seat cushion 10 and the seat back 20. Furthermore, two or more air discharge holes 102 may be formed at regular intervals in a headrest.

Referring to FIG. 3, an air distribution duct 110 for distributing air to the air discharge holes 102 is mounted in a space in a rear surface of the seat foam pad 100.

An air supply duct 112 is connected to a rear portion of the air distribution duct 110 to fluidically-communicate therewith, and the air supply duct 112 is connected to an air blower 50, which generates an air flow.

The air distribution duct 110 includes tube guides 114, which are formed in an expanded tube shape at a front outlet of the air distribution duct 110 such that air tubes 202 of the massage units 200 are easily guided into the air discharge holes 102 when the air tubes 202 move forwards, which will be described later. The tube guides 114 may be integrally formed with the air distribution duct 110.

According to an exemplary embodiment of the present invention, the massage units 200 are mounted on the bottom surface (i.e., the back plate) of the air distribution duct 110. The massage units 200 are configured to move forwards and backwards to open or close the air discharge holes 102 or to move forwards and backwards in the air discharge holes 102 to massage an occupant.

Preferably, each of the massage units 200 includes an air tube 202, which is formed in a bellows shape to be expanded or contracted by pneumatic pressure.

In more detail, in the state of being secured to the bottom surface (i.e., the back plate) of the air distribution duct 110, the bellows-shaped air tube 202 of each massage unit 200 moves forwards toward a corresponding air discharge hole 102 ahead thereof while being expanded by air-charging pressure, or moves backwards away from a corresponding air discharge hole 102 while being contracted by air-suctioning pressure in the air tube.

Furthermore, a massage bar 204 is attached to the front end portion of the air tube 202. The massage bar 204 is made of a hard material (e.g., rubber or plastic) to block a corresponding air discharge hole 102 in the seat foam pad 100 or massage the occupant's body through a corresponding air discharge hole 102.

Furthermore, an air pump 208 is connected to the rear end portions of the air tubes 202 via an air hose 206 to fluidically-communicate therewith. The air pump 208 is driven and controlled by a controller 300 to charge or suction air into or from the air tubes 202.

The controller 300 may control the amount of driving of the air pump 208 based on information related to a body pressure of an occupant accommodated in the seat and information related to a temperature and humidity at the contact portion between the occupant and the seat. The amount of motion in the forward-backward direction (or the moving distance in the forward-backward direction) of the air tube 202 of each massage unit 200 may be controlled in accordance with the amount of driving of the air pump 208.

To the present end, to provide body pressure information to the controller 300, as shown in FIG. 2, a body-pressure-detecting mat 130, to which a plurality of body pressure sensors 132 is attached, is mounted between the seat foam pad 100 and a seat cover 120 mounted thereon. The body-pressure-detecting mat 130 is made of a flexible material.

Furthermore, to provide temperature and humidity information to the controller 300, as shown in FIG. 2, a temperature sensor 134 and a humidity sensor 136 are attached to positions adjacent to the outlet of each air discharge hole 102 in the seat foam pad 100.

Figure 8:
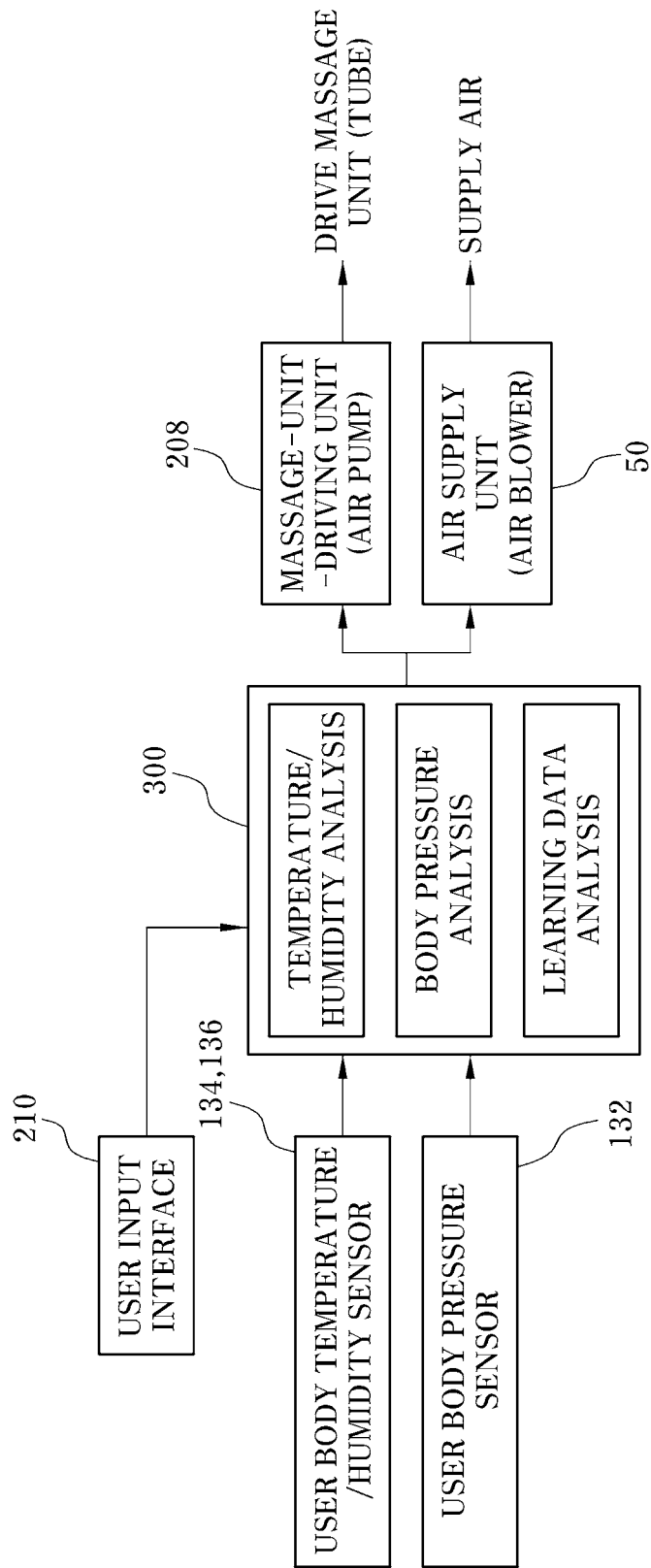
FIG. 8 is a control constitutional diagram of the ventilation and massage device configured for a seat according to an exemplary embodiment of the present invention.

Therefore, as shown in the control constitutional diagram of FIG. 8, the controller 300 receives information related to the body pressure detected by the body pressure sensors 132, information related to the temperature detected by the temperature sensor 134, and information related to the humidity detected by the humidity sensor 136. Subsequently, the controller 300 analyzes the body pressure distribution over the seat, the temperature distribution over the portion of the seat which is in contact with the occupant's body, and the humidity distribution over the portion of the seat which is in contact with the occupant's body. Subsequently, the controller 300 automatically performs control modes, such as a normal ventilation mode, an intensive ventilation mode, and a massage mode.

In the normal ventilation mode, the controller 300 performs control such that the massage units 200 are not driven and such that only the air flow volume of the air blower 50 is adjusted, causing air to pass through the air distribution duct 110 and finally to be discharged toward the occupant's body through the air discharge holes 102.

In the intensive ventilation mode, the controller 300 controls the air pump 208 to be driven with first driving power such that air from the air pump 208 is charged into the air tubes 202 of the massage units 200 and such that the air tubes 202 move a predetermined distance forwards to block one or more selected air discharge holes 102.

Accordingly, when the air tubes 202 block one or more selected air discharge holes 102, air may be intensively discharged toward a body portion desired by the occupant through the remaining open air discharge holes 102.

In the massage mode, the controller 300 controls the air pump 208 to be driven with second driving power such that air from the air pump 208 is further charged into the air tubes 202 of the massage units 200 and such that the air tubes 202 move a predetermined distance forwards to penetrate one or more selected air discharge holes 102.

Accordingly, when the air tubes 202 move a predetermined distance forwards to penetrate one or more selected air discharge holes 102, the massage bars 204 attached to the front end portions of the air tubes 202 massage the occupant's body in the manner of striking the same.

Figure 7:
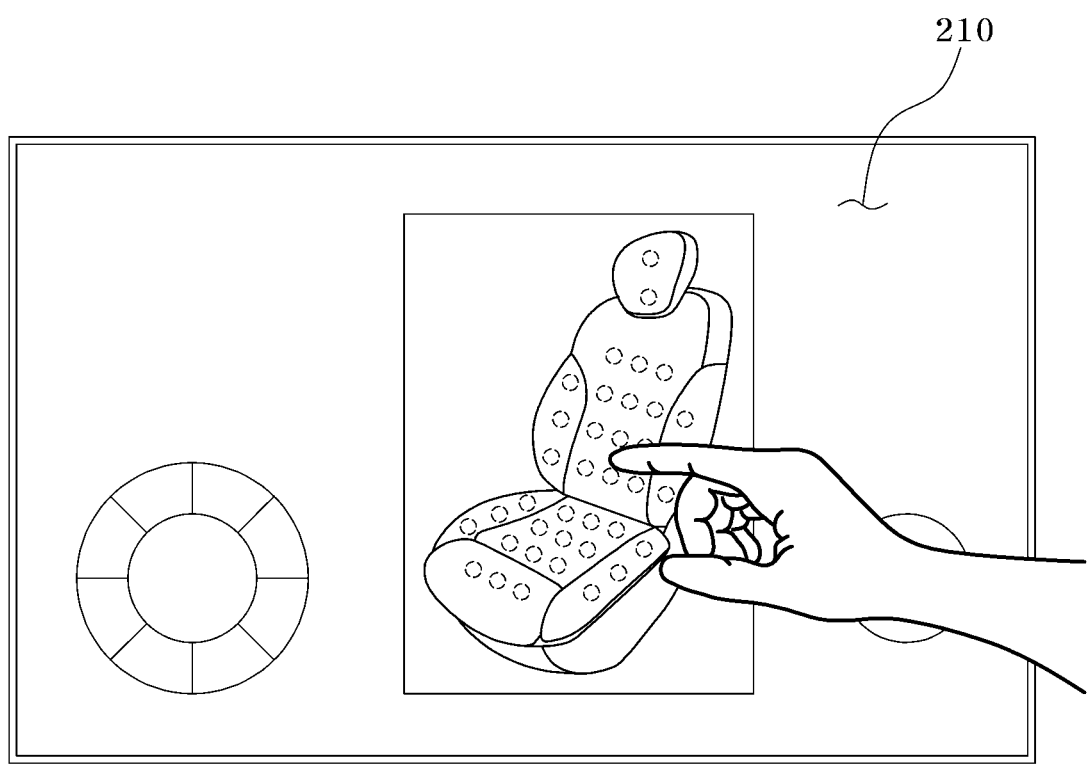
FIG. 7 is a view schematically illustrating a user input interface of the ventilation and massage device configured for a seat according to an exemplary embodiment of the present invention.

Referring to FIG. 7, a user input interface is configured to display a seat-shaped menu through a display 210 provided in the vehicle such that the occupant manually touches the menu to select a desired body portion. Upon receiving the manual touch input from the occupant, the controller 300 may execute a manual mode for providing ventilation and massage functions to the selected body portion based on the touch input signal.

Furthermore, when the manual touch input by the occupant is repeated a predetermined number of times, or when the ventilation and massage operations are repeatedly performed on a specific body portion (e.g., a body portion with very high body pressure, temperature or humidity), the controller 300 may generate learning data based on such repeated operations, and may execute an automatic mode based on the learning data.

Hereinafter, the operation of the ventilation and massage device according to an exemplary embodiment of the present invention, configured as described above, will be described.

Normal Ventilation Mode

Figure 4A:
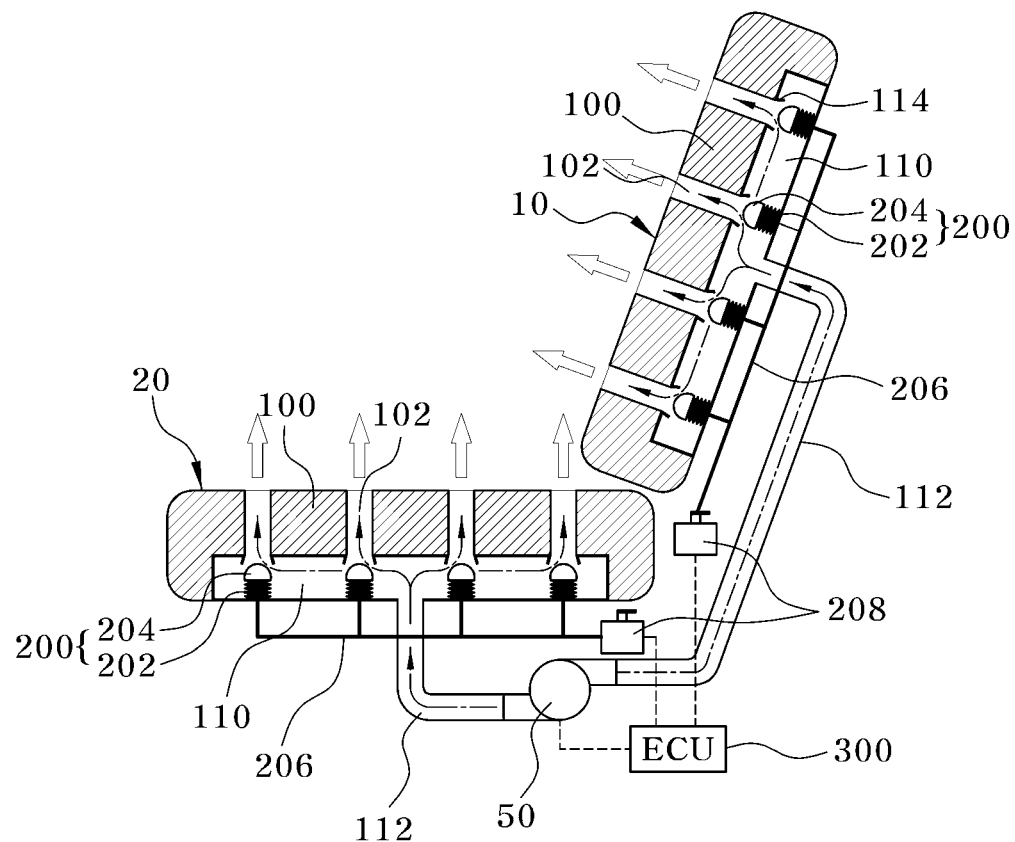
FIG. 4A and FIG. 4B are side cross-sectional views illustrating the operation of a normal ventilation mode of the ventilation and massage device configured for a seat according to an exemplary embodiment of the present invention.
Figure 4B:
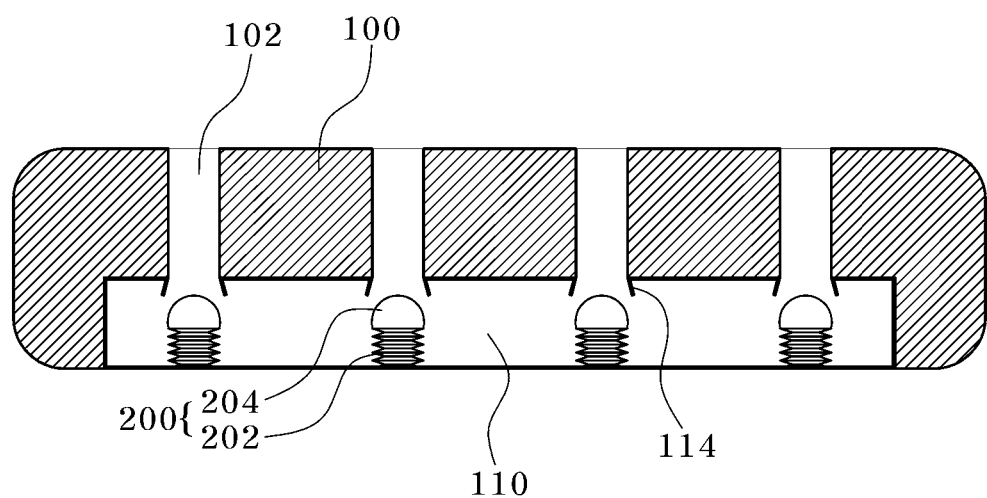

FIG. 4A and FIG. 4B are side cross-sectional views illustrating the operation of the normal ventilation mode of the ventilation and massage device configured for a seat according to an exemplary embodiment of the present invention.

First, the controller 300 receives information related to the body pressure detected by the body pressure sensors 132, information related to the temperature detected by the temperature sensor 134, and information related to the humidity detected by the humidity sensor 136. Subsequently, the controller 300 analyzes the body pressure distribution over the seat, the temperature distribution over the portion of the seat which is in contact with the occupant's body, and the humidity distribution over the portion of the seat which is in contact with the occupant's body.

As a result of the analysis, when the body pressure applied to a specific portion of the seat is found not to exceed a predetermined reference value and when the temperature and the humidity are evenly distributed within a predetermined reference range, the controller 300 performs control such that the air tubes 202 of the massage units 200 are not driven (i.e., are maintained at the original positions away from the air discharge holes 102) and such that only the air flow volume of the air blower 50 is adjusted, causing air to pass through the air distribution duct 110 and finally to be discharged toward the occupant's body through the air discharge holes 102.

As a result, the occupant feels comfortable over all portions of the body that are in contact with the seat.

Intensive Ventilation Mode

Figure 5A:
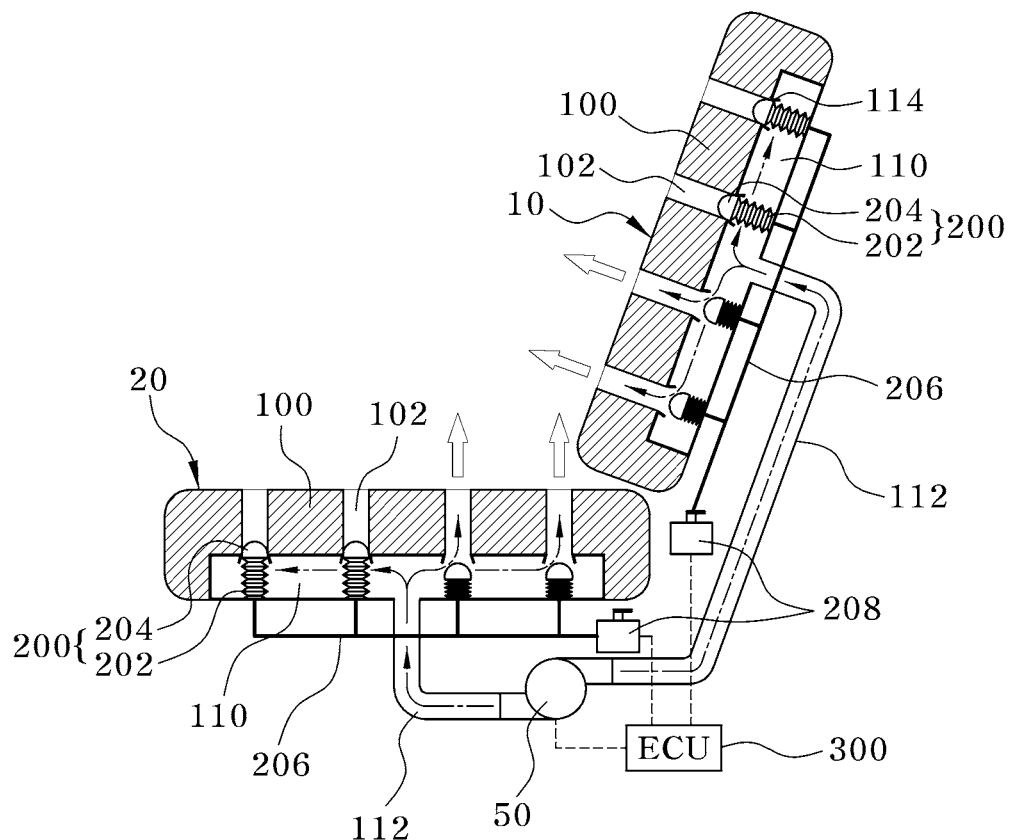
FIG. 5A and FIG. 5B are side cross-sectional views illustrating the operation of an intensive ventilation mode of the ventilation and massage device configured for a seat according to an exemplary embodiment of the present invention.
Figure 5B:
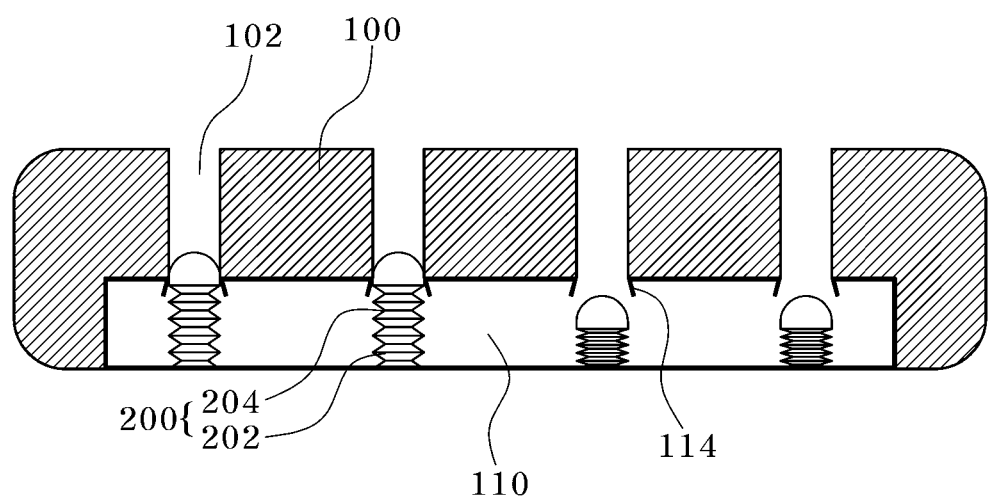

FIG. 5A and FIG. 5B are side cross-sectional views illustrating the operation of the intensive ventilation mode of the ventilation and massage device configured for a seat according to an exemplary embodiment of the present invention.

First, the controller 300 receives information related to the body pressure detected by the body pressure sensors 132, information related to the temperature detected by the temperature sensor 134, and information related to the humidity detected by the humidity sensor 136. Subsequently, the controller 300 analyzes the body pressure distribution over the seat, the temperature distribution over the portion of the seat which is in contact with the occupant's body, and the humidity distribution over the portion of the seat which is in contact with the occupant's body.

As a result of the analysis, when the body pressure applied to a specific portion of the seat is found not to exceed a predetermined reference value but when the temperature distribution and the humidity distribution in a specific portion of the seat are out of a predetermined reference range (i.e., the temperature and the humidity exceed predetermined reference values), the controller 300 applies a first driving power signal to the air pump 208 such that air is charged into the air tubes 202 located at positions corresponding to the portions of the seat at which the temperature and the humidity are relatively low.

Subsequently, the air tubes 202, into which air is charged from the air pump 208, move a predetermined distance to block the air discharge holes 102 formed at positions corresponding to the portions of the seat at which the temperature and the humidity are relatively low.

Accordingly, since the air tubes 202 block the air discharge holes 102 formed at positions corresponding to the portions of the seat at which the temperature and the humidity are relatively low, air may be intensively discharged through the remaining open air discharge holes 102 formed at positions corresponding to the portions of the seat at which the temperature and the humidity exceed predetermined reference values.

As described above, since the air discharge holes for ventilation formed in the seat are selectively blocked by the air tubes 202 of the massage units, it is possible to intensively discharge air toward a body portion desired by an occupant (e.g., a body portion with high humidity and temperature), increasing the comfort of the occupant.

Massage Mode

Figure 6A:
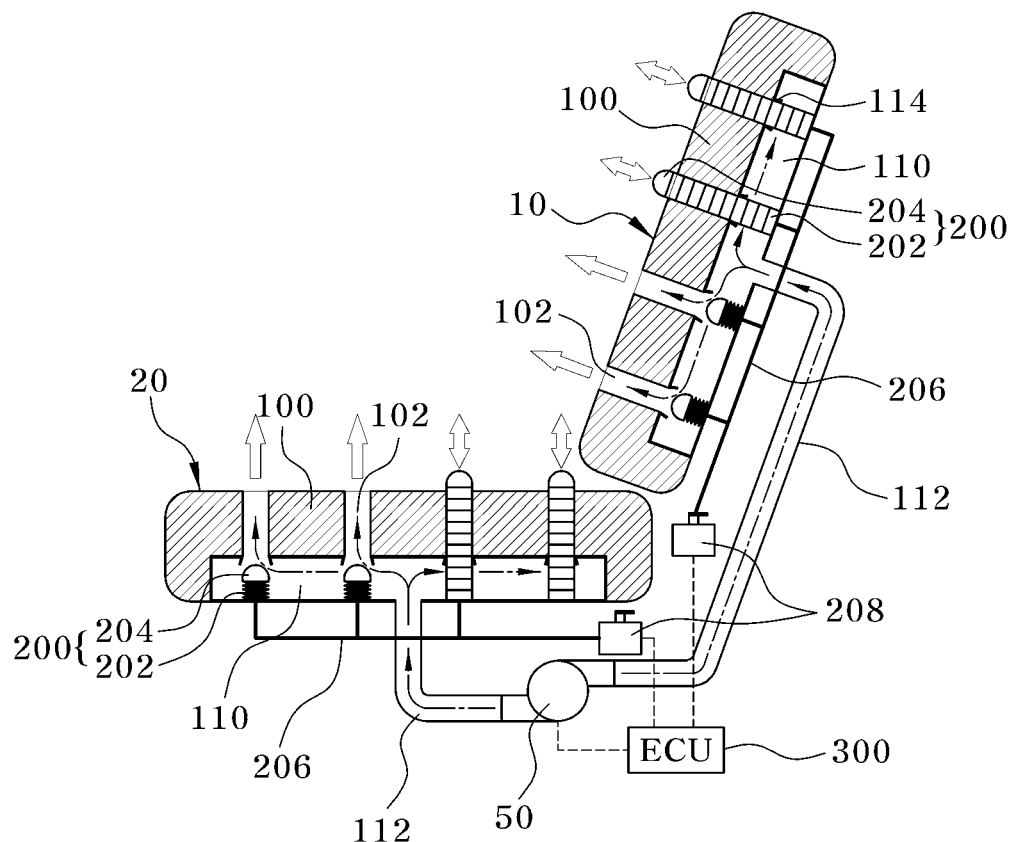
FIG. 6A and FIG. 6B are side cross-sectional views illustrating the operation of a massage mode of the ventilation and massage device configured for a seat according to an exemplary embodiment of the present invention.
Figure 6B:
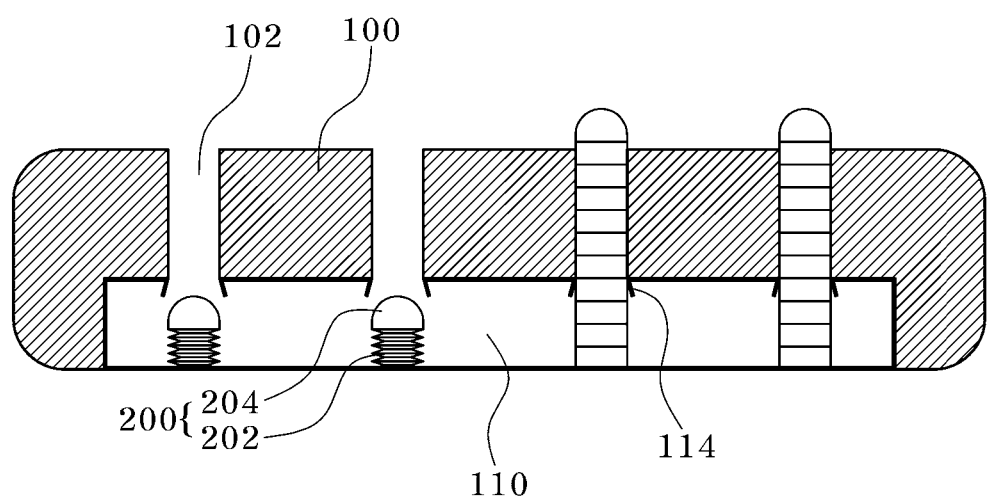

FIG. 6A and FIG. 6B are side cross-sectional views illustrating the operation of the massage mode of the ventilation and massage device configured for a seat according to an exemplary embodiment of the present invention.

First, the controller 300 receives information related to the body pressure detected by the body pressure sensors 132, information related to the temperature detected by the temperature sensor 134, and information related to the humidity detected by the humidity sensor 136. Subsequently, the controller 300 analyzes the body pressure distribution over the seat, the temperature distribution over the portion of the seat which is in contact with the occupant's body, and the humidity distribution over the portion of the seat which is in contact with the occupant's body.

As a result of the analysis, when the body pressure applied to a specific portion of the seat exceeds a predetermined reference value, the controller 300 applies a second driving power signal to the air pump 208 such that air is charged into the air tubes 202 located at positions corresponding to the portions of the seat at which the body pressure is relatively high.

For example, when an occupant is accommodated in the seat for a long time, if the occupant's back portion keeps contacting with the seat due to the occupant's body type or driving posture, the body pressure between the occupant's back portion and the seat may increase, and the occupant may thus suffer from muscular stiffness or muscular pain in the back and shoulders. Therefore, the controller 300 applies a second driving power signal to the air pump 208 such that air is charged into the air tubes 202 located at positions corresponding to the occupant's back portion.

Subsequently, air from the air pump 208 is further charged into the air tubes 202 of the massage units 200 such that the air tubes 202 move a predetermined distance forwards to penetrate the air discharge holes 102 formed in the portions of the seat at which the body pressure is relatively high, massaging the occupant's body (the body portion with high body pressure) in the manner of striking the same.

Actually, the massage bars 204 attached to the front end portions of the air tubes 202 massage the occupant's body (the body portion with high body pressure) in the manner of striking the same.

Accordingly, since the air tubes 202 move a predetermined distance forwards to penetrate one or more selected air discharge holes 102, the massage bars 204 attached to the front end portions of the air tubes 202 massage the occupant's body in the manner of striking the same, simultaneously providing the massage function as well as the ventilation are configured to the occupant.

Meanwhile, when the controller 300 controls the air pump 208 to be repeatedly driven in the forward direction and the reverse direction thereof, the operation of charging the air from the air pump 208 into the air tubes 202 and the operation of discharging the air from the air tubes 202 are repeated, facilitating the massage operation of repeatedly striking the occupant's body using the massage bars 204 attached to the air tubes 202.

As described above, it is possible to selectively or simultaneously provide the ventilation function and the massage function to an occupant accommodated in a seat of a vehicle, and thus the marketability of the seat and user comfort may be increased.

As is apparent from the above description, the ventilation and massage device configured for a seat according to an exemplary embodiment of the present invention has the following effects.

First, massage units, which are mounted in an air ventilation passage formed in a seat, open or close one or more selected air discharge holes formed in the seat, intensively discharging air toward a body portion desired by an occupant accommodated in the seat (e.g., a body portion with high humidity and temperature).

Second, the massage units move forwards and backwards to massage a body portion desired by the occupant accommodated in the seat (e.g., a body portion to which high body pressure is applied by the seat) in the manner of striking the same, increasing the comfort of the occupant.

Third, the massage units are mounted in the air ventilation passage formed in the seat, efficiently placing the components of the ventilation and massage device in a limited area of the seat and improving space utilization.

Fourth, it is possible to selectively or simultaneously provide a ventilation function and a massage function to an occupant accommodated in a seat of a vehicle, increasing the marketability of the seat and use convenience.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A ventilation and massage device for a seat, the device comprising:
    a seat foam pad including a plurality of air discharge holes formed in the seat foam;
    an air distribution duct mounted in a space in a rear surface of the seat foam pad and fluidically-connected to the plurality of air discharge holes, the air distribution duct being configured to distribute air to the plurality of air discharge holes;
    massage units mounted on a bottom surface of the air distribution duct, the massage units being configured to move forwards and backwards to open or close the plurality of air discharge holes or penetrate the plurality of air discharge holes; and
    a controller electrically connected to the massage units and configured to control an amount of movement of the massage units based on information related to a body pressure of an occupant accommodated in the seat and temperature information and humidity information at a contact portion between the occupant and the seat.

2. The ventilation and massage device of claim 1, further including:
    an air supply duct connected to the air distribution duct to supply air from an air blower to the air distribution duct.

3. The ventilation and massage device of claim 1, wherein each of the massage units includes an air tube having bellows, and
    wherein, in a state of being secured to a bottom portion of the air distribution duct, the air tube moves forwards toward a corresponding one of the plurality of air discharge holes while being expanded by air-charging pressure in the air tube and moves backwards away from a corresponding one of the plurality of air discharge holes while being contracted by air-suctioning pressure in the air tube.

4. The ventilation and massage device of claim 3, wherein each of the massage units further includes a massage bar attached to a front end portion of the air tube, and
    wherein the massage bar blocks a corresponding one of the plurality of air discharge holes formed in the seat foam pad or penetrates a corresponding one of the plurality of air discharge holes to massage a body of the occupant.

5. The ventilation and massage device of claim 4, wherein the air distribution duct includes tube guides formed at an outlet thereof to the guide the massage bar of the massage units toward the plurality of air discharge holes.

6. The ventilation and massage device of claim 3, further including:
    an air pump electrically connected to the controller and connected to a rear end portion of the air tube via an air hose,
    wherein the air pump is driven and controlled by the controller to charge air into or draw air from the air tube.

7. The ventilation and massage device of claim 6, wherein the air tube moves a predetermined distance forwards and backwards to open or close a corresponding one of the plurality of air discharge holes in accordance with a first amount of driving of the air pump in a response to a ventilation mode control signal of the controller.

8. The ventilation and massage device of claim 6, wherein the air tube moves a predetermined distance forwards and backwards to penetrate a corresponding one of the plurality of air discharge holes in accordance with a second amount of driving of the air pump in a response to a massage mode control signal of the controller.

9. The ventilation and massage device of claim 1, wherein the air distribution duct includes tube guides formed at an outlet thereof to guide the massage units toward the plurality of air discharge holes.

10. The ventilation and massage device of claim 1, further including:
    a body-pressure-detecting mat mounted between the seat foam pad and a seat cover mounted thereon to provide body pressure information to the controller,
    wherein the body-pressure-detecting mat is mounted with a plurality of body pressure sensors attached thereto, and is made of a flexible material.

11. The ventilation and massage device of claim 1, further including:
    a temperature sensor; and
    a humidity sensor,
    wherein the temperature sensor and the humidity sensor are attached to positions adjacent to an outlet of each of the plurality of air discharge holes formed in the seat foam pad to provide the temperature information and the humidity information to the controller.

* * * * *